Jan. 18, 1966  R. J. GUGLIELMO, SR  3,229,977
BOWLING PIN WITH PLASTIC SHELL AND EXPANDED PLASTIC CORE
Filed Nov. 13, 1961
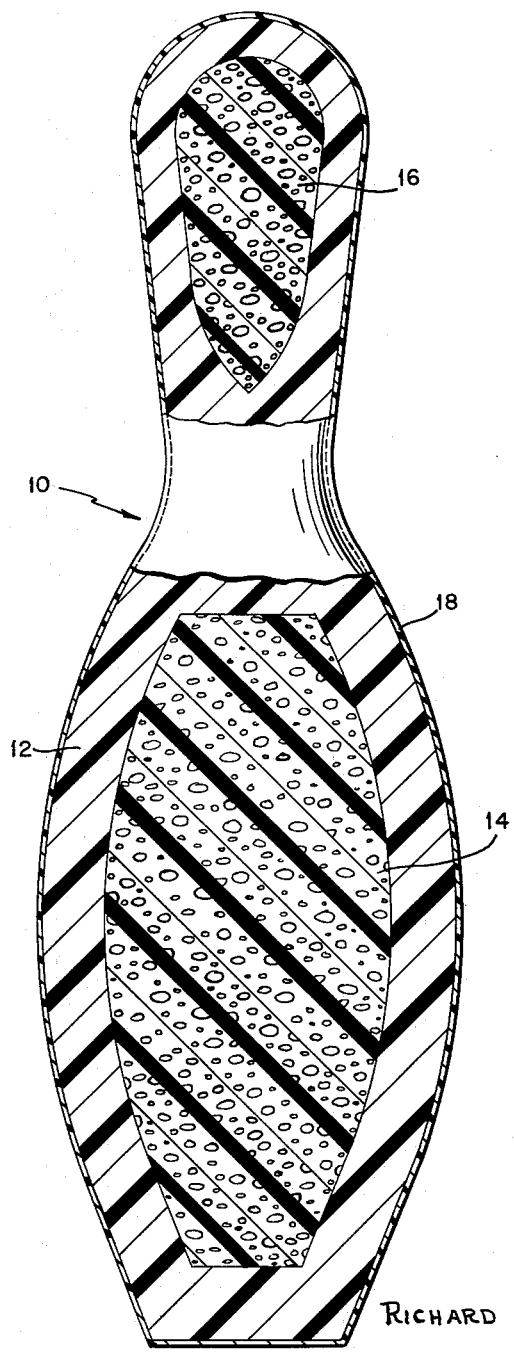
INVENTOR
RICHARD J. GUGLIELMO, SR.
BY *Philip D. Junkins*
ATTORNEY

United States Patent Office 3,229,977
Patented Jan. 18, 1966

3,229,977
BOWLING PIN WITH PLASTIC SHELL AND
EXPANDED PLASTIC CORE
Richard Joseph Guglielmo, Sr., Cresskill, N.J., assignor, by mesne assignments, to Poly-Chem Development Corp., Passaic, N.J., a corporation of New Jersey
Filed Nov. 13, 1961, Ser. No. 151,613
4 Claims. (Cl. 273—82)

This invention relates to bowling pins and more particularly to plastic bowling pins having improved life characteristics while duplicating all desirable physical characteristics of the wooden bowling pins classically utilized throughout the bowling industry including rebound and sound as well as comparable weight.

It has been customary in the bowling industry to use bowling pins manufactured of wood. Such wooden pins have normally been made of a single solid piece of silver maple wood or laminated pieces of silver maple wood which has been aged for a number of years and then kiln dried. The single piece or laminated wooden preforms are carefully turned to near specification diameters throughout their length and then finely polished and accurately finished. Because of variation in grain and wood density from point to point, the finished laminated pin structure may be unbalanced in that its center of gravity may not coincide with the pin axis and/or may be located at an inappropriate distance above the pin base. Moreover, because of grain and density differences, no two wooden pins can possibly be exactly alike.

While uniformity of pin weight is highly desirable, the aforementioned grain and density variations in the woods utilized in pin manufacture has forced pin certifying organizations to establish pin standards with substantial tolerances. For instance, the classic wooden pin of the bowling industry weighs between three pounds, two ounces and three pounds, ten ounces. Further tolerance is given in the location of the center of gravity, being specified at a maximum and $5^{15}/_{16}$ inches and minimum of $5^{10}/_{16}$ inches above the base of the pin.

Inasmuch as the pins are struck by bowling balls which are traveling at a high rate of speed and since the striking area between the ball and the pin is relatively small, each time a pin is struck by a bowling ball, it is damaged to some extent. Furthermore, the bowling pins fly when struck by the bowling balls and strike each other or components in the alley pit. This results in further damage to the pins.

Numerous attempts have been made to provide a bowling pin which will withstand the shock of the impact of an eleven to sixteen pound bowling ball and yet have proper rebound and sound. Many pin reinforcing schemes have been proposed to increase the impact strength of pins with the result that the reinforced pin does not react or rebound in the same manner as the conventional maple bowling pin. Reinforced pins have likewise failed to yield the usual sound of bowling balls striking the maple pin. Also, much experimentation has been carried out in the area of coating wooden cores with various high impact strength materials including vulcanized rubbers and synthetic plastics such as cellulose butyracetate, polyvinyl chloride and ethyl cellulose. Other pins have been molded in their entirety of hard rubbers, plastics and composition materials. In general, the well-known plastics, which have in many applications replaced wood, have not proved to be suitable for manufacturing bowling pins because of inherent inabilities to absorb the high shock forces encountered and their deficiencies in bounce characteristics.

Recently, efforts have been made to increase the minimum life expectancy of one thousand games for wooden bowling pins. One method of treatment, which has been found to increase pin life by approximately fifty percent, involves applying an initial impregnating coating of nylon to the pin followed by successive coatings of ethyl cellulose and polyurethane. Another manufacturer has merely applied an impregnating coating of nylon over the central high impact area around the pin. While such coated pins have a longer life than ordinary wooden pins, failure eventually occurs as a result of the formation of blisters or pockets between the covering and the wooden core.

It is an object of the present invention to provide a relatively inexpensive bowling pin made of synthetic plastic materials.

It is another object of the invention to provide a molded plastic bowling pin having improved strength and performance characteristics and which can be manufactured in quantity with extreme uniformity of weight and accurate positioning of the center of gravity.

It is a still further object of this invention to provide a molded plastic bowling pin having superior impact strength and shock absorbency together with proper rebound characteristics.

It is another object of the invention to provide an improved bowling pin which is more resistant to breakage and more capable of retaining its liveliness or ability to rebound after an extended period of service.

It is yet another object of the present invention to provide a relatively inexpensive molded plastic bowling pin having improved strength and performance characteristics and which sounds like a wooden pin upon being struck by regulation bowling balls.

These and other objects and advantages of the present invention will hereinafter appear and for purposes of illustration, but not of limitation, an embodiment of this invention is shown in the accompanying drawing, in which the figure is a longitudinal sectional view of a bowling pin embodying the features of this invention with the elements designated by number therein.

All prior attempts to fabricate a suitable plastic bowling pin have failed because of the inability of the plastics employed to meet in total the criteria established by the classic wooden pin. The common plastics including polyethylenes, vinyls, polystyrenes, urethanes, etc. in rigid form (when cast in the shape of bowling pins) have been unable to withstand the high impact forces or absorb the shock stresses encountered during normal pin usage. The foam plastics, while in some cases evidencing adequate shock absorbing qualities, do not have sufficient weight and rebound. Another failing has been the inability of plastics in bowling pin form to sound like a wooden pin upon being struck under game conditions with a regulation bowling ball.

It has been found in accordance with the practice of this invention that an improved bowling pin can be fabricated with a shock absorbing core and a compatible plastic body or shell portion exhibiting in its outer surface of revolution the classic pin shape and possessing extremely high longitudinally oriented impact strength.

Referring now to the drawing, the bowling pin 10 of this invention comprises a body or shell portion 12, bottom and top cores 14 and 16, respectively, and a shell or skin portion 18.

The body 12 of the pin 10 may be comprised of a cast plastic material formed by the polymerization of a suitable thermosetting resin. The final body portion 12 must be strong, tough and rigid and, during curing must exhibit controllable shrinkage. The cast body surrounds one or more core pieces which are preshaped from relatively low density, shock-absorbing materials such as synthetic cellular materials including closed-cell expanded thermoplastic resins or natural materials including cork. In the preferred embodiment, illustrated, two cores are so formed and oriented as to completely and uniformly fill, in axial alignment, the upper and lower portions of the pin, leaving a solid intermediate cast neck portion to the rigid body 12.

It has been found that the high impact stresses experienced by bowling pins are primarily longitudinally oriented with the most critical area for breakage located in the reduced diameter neck portion. To increase the impact strength of the pin of the invention, there may be provided an outer skin 18 also formed of a thermosetting resin and preferably the same resin as the thermosetting resin of the cast body 12 or a resin compound physically and chemically compatible with said cast body. This outer skin is reinforced, particularly in a longitudinal or axial direction, by fibrous filling material such as discontinuous or staple glass fibers. Continuous glass fibers may be employed in the form of mats fabricated as by swirling the endless filaments or strands of continuous fibers, or they may be chopped or cut to shorter lengths for mat or batt formation.

The relationship of relative volumes of pin cores and pin body, in accordance with the invention, is important in establishing (for given thermoplastic and thermosetting materials) the finished weight of the pin. As heretofore mentioned, regulation bowling pins weigh between three pounds, two ounces, and three pounds, ten ounces. For example, to duplicate the weight characteristics of a three pound, eight ounce regulation pin using a cellular pin core material (urethane foam) having a specific gravity of 0.004 and a thermosetting resin yielding a cured rigid plastic pin body portion having a specific gravity of 1.17, the total core volume was established at 64% of the pin volume where such three pound, eight ounce pin had a specific gravity of 0.765. In the foregoing example, the specific gravity of the outer skin approximated the 1.17 specific gravity of the pin body portion.

Investigations relative to the suitability of the well-known synthetic plastics for manufacturing bowling pins has yielded the following observations. The common thermoplastics, which can normally be molded by blow molding, injection molding and slush molding techniques, are difficult to utilize in the context of the heavy molded section of a bowling pin. For heavy objects, such as bowling pins, molding reproducibility with thermoplastics is poor and heat control is critical and difficult to maintain and control. Too much heat results in charring while too little heat results in poor flow characteristics.

Of the common thermosetting resins, polyesters have shown good flexibility and hardness characteristics and good moldability in the context of bowling pin manufacture but such plastics exhibit relatively poor bounce and sound characteristics as compared to the classic wooden pin. The epoxy resins have generally poor molding and finishing characteristics and, without modifiers, become extremely brittle. Further, the epoxies have good bounce characteristics but have high specific gravities and poor sound characteristics. Phenolics, like epoxies, are normally too brittle for high impact applications and for absorbing shock.

Through the present invention a bowling pin 10 can be economically manufactured of any desired weight and reaction to impact by the bowling ball depending upon the volume and weight of the shock absorbing core or cores 14 and 16; thickness and relative volume of the body portion 12; and choice of materials employed in both the cores and the pin body. The shock-absorbing core or cores may be formed of low specific gravity foamed thermoplastics including polyvinyl foams, polyethylene foams and urethane foams. Cork may be utilized also as the shock-absorbing core material. Of the foamed materials mentioned, polyurethane is preferred where a plastic material having a relatively high critical temperature is required. Polyethylene and polyvinyl chloride are preferred where superior compression set and excellent recovery for overall good shock-absorbency is required. As natural materials, lightweight corks likewise have good shock-absorbing characteristics and high critical temperatures.

As heretofore mentioned, in accordance with the invention the body portion 12 of the pin 10 is formed of a thermosetting resin. It is essential that the exotherm of this outer body material not exceed the critical temperature of the foam or cork core material during fabrication of the pin in order to avoid charring or destruction of the core material and so that the core or cores and body portion do not shrink away from each other. By proper choice of materials any significant shrinkage is avoided and the core and body portion (subjected to heat during pin fabrication) are intimately joined at their interface. A thermosetting material which has been found to be exceptionally suitable for fabricating the body portion of the bowling pin of the present invention is the resin formed as a result of catalytic polymerization of 3,9-divinyl-spirobi (meta-dioxane) monomer. The spirobi monomer is classically prepared by the condensation of a mole of pentaerythritol with two moles of acrolein or an acrolein derivative in the presence of an acid catalyst such as p-toluenesulfonic. A liquid A-stage resin of suitable character can be prepared by catalyzed reaction of 1.3 moles of acrolein per mole of pentaerythritol. The spirobi based A-stage resin or polymerized spirobi monomer together with appropriate fillers, coloring pigments (such as titanium dioxide) and catalyst (such as diethyl sulfate), when brought to proper temperature (95° C. to 150° C. and preferably 95° C. to 105° C.), yields a moldable thermosetting plastic having: (when cored) ideal bounce and wood sound characteristics together with exceptional impact strength and long life; and the proper degree of hardness as specified by pin certifying agencies.

As previously mentioned, the bowling pin of this invention may be fabricated with an outer shell 18 for added impact strength, particularly in the neck area of the pin. Such shell is preferably composed of the same thermosetting resin material as utilized in the pin body 12, appropriately reinforced by strong longitudinally oriented fibrous material such as glass fibers. The outer shell or skin 18 may be 80 to 100 mils thick or more or less as desired and is also intimately united with the pin body 12 at the interface of such shell and body portions.

Although not illustrated, the base of the pin of this invention may be provided with a recess of appropriate character and dimensions so that the pin will receive the pin or peg of the well-known pin setting device.

While the invention has been described in its preferred form, other modifications may be resorted to without departing from the spirit thereof, and the scope of the invention will be best defined in the appended claims.

I claim:

1. A synthetic bowling pin of standard size and shape having improved rebound, impact and sound characteristics comprising: a rigid molded hollow shell including an upper head portion, a lower body portion and an intermediate neck portion, said shell externally defining said pin and internally defining central cavities within said head and body portions and formed of high-density high-impact strength solid cured 3,9-divinyl-spirobi based A-stage thermosetting resin; and weight compensating relatively low-density shock-absorbing core material of substantially uniform specific gravity throughout and disposed within and completely filling said cavities, said weight compensating material consisting of a closed-cell expanded thermoplastic resin whereby said pin has a specific gravity within certified bowling pin specifications.

2. A synthetic bowling pin as claimed in claim 1 wherein the cavities within the head portion and the body portion are isolated from one another by the cured A-stage thermosetting resin in the intermediate neck portion of the shell.

3. A synthetic bowling pin as claimed in claim 1 wherein the closed-cell expanded thermoplastic resin comprising the core material of said pin is selected from the group consisting of polyurethane, polyethylene and polyvinyl chloride.

4. A synthetic bowling pin as claimed in claim 1 wherein the rigid molded hollow shell defining said pin bears a relatively thin outer coating of cured 3,9-divinyl-spirobi based A-stage thermosetting resin including strengthening glass fibers.

References Cited by the Examiner

UNITED STATES PATENTS

| | | | |
|---|---|---|---|
| 2,775,456 | 12/1956 | Schroeder et al. | 273—82 |
| 2,909,506 | 10/1959 | Guest et al. | 260—67 |
| 2,988,359 | 6/1961 | Dettman | 273—82 |
| 3,022,273 | 2/1962 | Guest et al. | 260—67 X |
| 3,037,771 | 6/1962 | Gambino | 273—82 |
| 3,042,630 | 7/1962 | Ropp | 260—67 X |
| 3,147,975 | 9/1964 | Gruss et al. | 273—82 |

FOREIGN PATENTS 884,983   12/1961   Great Britain.

RICHARD C. PINKHAM, *Primary Examiner.*

DELBERT B. LOWE, *Examiner.*